Patented Dec. 6, 1949

2,490,672

UNITED STATES PATENT OFFICE 2,490,672

NITROETHYLPYRIDINES

Francis E. Cislak and Leslie Hunt Sutherland, Indianapolis, Ind., assignors to Reilly Tar & Chemical Corporation, Indianapolis, Ind., a corporation of Indiana No Drawing. Application November 14, 1946, Serial No. 709,798

8 Claims. (Cl. 260—283)

This invention relates to a new class of chemical compounds and to the process of making them. More particularly it relates to nitroethylpyridines and to the process of making them.

In general, the compounds of our present invention may be prepared by reacting a vinylpyridine with nitrous acid.

Our invention will be described more fully in conjunction with the following examples. It should be understood, however, that these examples are given by way of illustration only and the invention is not to be limited by the details set forth therein. Parts are by weight.

EXAMPLE 1

*2-nitroethylpyridine*

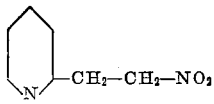

Fifty-two parts of 2-vinylpyridine is dissolved in 180 parts of ethyl alcohol; to this solution is added 35 parts of finely divided sodium nitrite. The resulting suspension is heated to about 60° C. and 50 parts of concentrated hydrochloric acid is added slowly to it, the suspension is stirred continually during the addition of the hydrochloric acid. An instantaneous reaction occurs; a precipitate of sodium chloride is formed and nitrous acid is liberated. After all the hydrochloric acid has been added, the precipitate of sodium chloride is removed by filtration; the filtrate is cooled, whereupon crystals of 2-nitroethylpyridine separate from the solution. The 2-nitroethylpyridine is isolated by filtration; it may be purified by recrystallization from ethyl alcohol. The so purified 2-nitroethylpyridine melts at about 145° C.

EXAMPLE 2

*4-nitroethylpyridine*

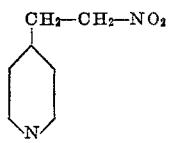

If in place of the 2-vinylpyridine of Example 1 we use 4-vinylpyridine, we obtain 4-nitroethylpyridine.

EXAMPLE 3

*2-nitroethyl-5-ethylpyridine*

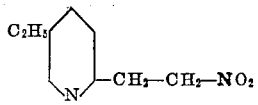

If in place of the 2-vinylpyridine of Example 1 and the 4-vinylpyridine of Example 2, we use 2-vinyl-5-ethylpyridine, we obtain 2-nitroethyl-5-ethylpyridine.

EXAMPLE 4

*2-nitroethyl-5,6-benzopyridine*

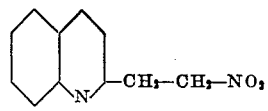

If in place of the 2-vinylpyridine of Example 1 we use 2-vinyl-5,6-benzopyridine (2-vinylquinoline) we obtain 2-nitroethyl-5,6-benzopyridine.

Reduction of the nitroethylpyridines yields the corresponding aminoethylpyridines.

The compounds of our present invention may be used in the synthesis of various pharmaceuticals, insecticides, photographic chemicals, etc.

We claim as our invention:

1. Nitroethylpyridines having the general formula:

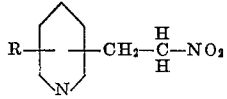

where R represents one of the class consisting of hydrogen, an alkyl radical and a benzo radical.

2. 2-nitroethylpyridine having the formula:

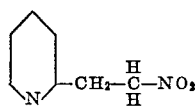

3. 4-nitroethylpyridine having the formula:

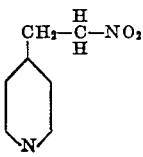

4. 2-nitroethyl-5,6-benzopyridine having the formula:

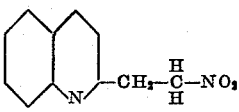

5. The process of preparing a nitroethylpyridine having the general formula

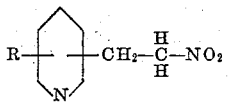

where R represents one of the class consisting of hydrogen, an alkyl radical and a benzo radical, which comprises reacting a vinylpyridine with nitrous acid and recovering the thus produced nitroethylpyridine.

6. The process of preparing a 2-nitroethylpyridine which comprises reacting a 2-vinylpyridine with nitrous acid and recovering the thus produced

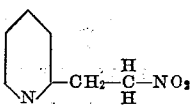

7. The process of preparing a 4-nitroethylpyridine which comprises reacting a 4-vinylpyridine with nitrous acid and recovering the thus produced

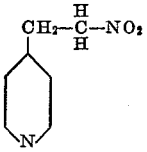

8. The process of preparing a 2-nitroethyl-5,6-benzopyridine which comprises reacting a 2-vinyl-5,6-benzopyridine with nitrous acid, and recovering the thus produced.

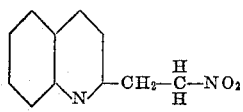

FRANCIS E. CISLAK.
LESLIE HUNT SUTHERLAND.

REFERENCES CITED

The following references are of record in the file of this patent:

Lucas "Organic Chemistry," American Book Co. 1935; pp. 71 and 72.